United States Patent [19]
Neri

[11] Patent Number: 5,282,530
[45] Date of Patent: Feb. 1, 1994

[54] DEVICE FOR THE RECEPTION AND THE TRANSFER TO A SUCCESSIVE CONVEYOR OF SUBSTANTIALLY PARALLELEPIPED PRODUCTS OR STACKS OF PRODUCTS

[75] Inventor: Armando Neri, Bologna, Italy
[73] Assignee: G.D. S.p.A., Bologna, Italy
[21] Appl. No.: 898,538
[22] Filed: Jun. 15, 1992

[30] Foreign Application Priority Data

Jun. 14, 1991 [IT] Italy ............................. B091A000209

[51] Int. Cl.$^5$ ................................................ B65G 29/00
[52] U.S. Cl. ................................ 198/473.1; 198/803.11
[58] Field of Search ............ 198/473.1, 803.11, 803.13

[56] References Cited

U.S. PATENT DOCUMENTS

| | | | |
|---|---|---|---|
| 2,358,292 | 9/1944 | Malhiot | 198/803.11 |
| 3,325,977 | 6/1967 | Kirsten | 198/803.11 X |
| 4,068,756 | 1/1975 | Loewenthal | 198/803.11 X |
| 4,893,707 | 1/1990 | Langen et al. | 198/803.11 X |

*Primary Examiner*—Cheryl L. Gastineau
*Attorney, Agent, or Firm*—Cushman, Darby & Cushman

[57] ABSTRACT

At least one compartment capable of movement in a direction substantially perpendicular to that in which the products are fed to the device. Each compartment has a size defined by opposing vertical wall members capable of relative movement therebetween for adjusting the size of the compartment. A drive system first moves the wall members relative to one another to adjust the size of the compartment(s) and then moves the wall members at a substantially equal velocity in the direction substantially perpendicular to that in which the products are fed to the device. A central control unit receives a size value of the product and controls the drive system to move the wall members relative to one another to adjust the size of the compartment to the product size value and then move the wall members at substantially equal velocity to move the compartment in the direction substantially perpendicular to that in which the products are fed to the device.

10 Claims, 4 Drawing Sheets

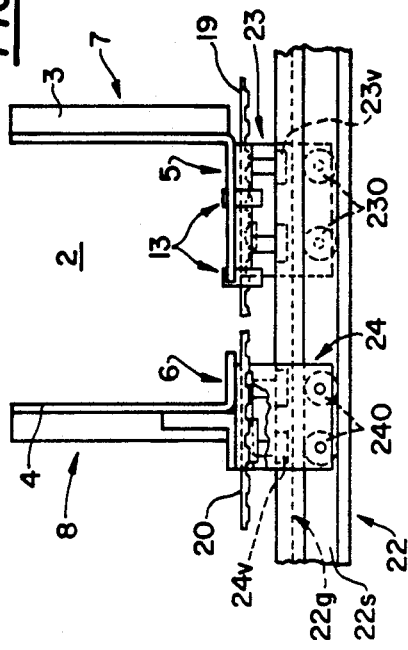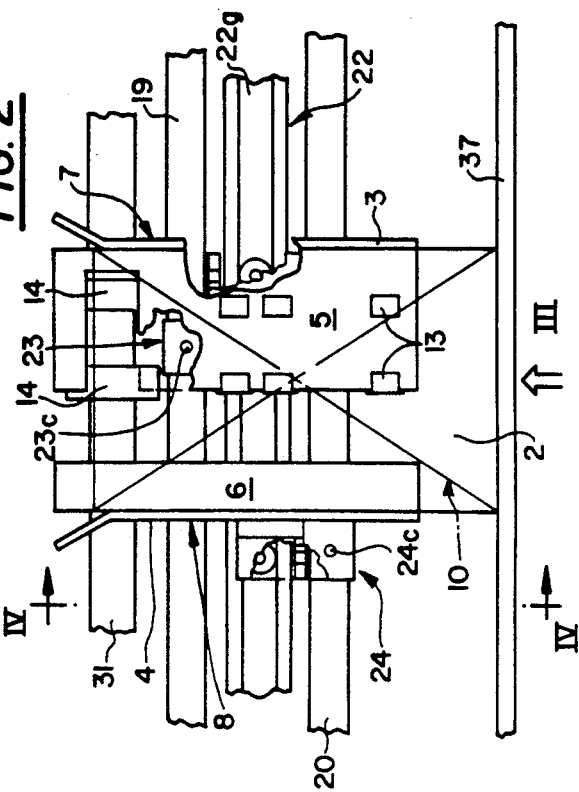

DEVICE FOR THE RECEPTION AND THE TRANSFER TO A SUCCESSIVE CONVEYOR OF SUBSTANTIALLY PARALLELEPIPED PRODUCTS OR STACKS OF PRODUCTS

BACKGROUND OF THE INVENTION

The present invention relates to a device by which substantially parallelepiped products or stacks of products can be transferred from one conveyor to another.

The object of the present invention is to embody a conveyor device free from the drawbacks described above.

SUMMARY OF THE INVENTION

The stated object is realized in a device according to the present invention in which products or stacks of products are transferred from one conveyor to another.

Such a device comprises at least one compartment having a size defined in part by opposing vertical wall members capable of relative movement therebetween for adjusting the size of the compartment. A drive system first moves the wall members relative to one another to adjust the size of the compartment(s) and then moves the wall members at a substantially equal velocity in a direction substantially perpendicular to that in which the products are fed to the device. A central control unit receives a product size value and controls the drive system to move the wall members relative to one another to adjust the size of the compartment to the product size value and then move the wall members at substantially equal velocity to move the compartment in the direction substantially perpendicular to that in which the products are fed to the device.

BRIEF DESCRIPTION OF THE DRAWINGS

The invention will now be described in detail, by way of example, with the aid of the accompanying drawings, in which:

FIG. 2 shows a detail of FIG. 1, enlarged and with certain parts cut away better to reveal others;

FIG. 3 is the view from III FIG. 2, in which certain parts are omitted better to reveal others;

FIG. 4 is the section through IV—IV in FIG. 2, in which certain parts are omitted better to reveal others;

DESCRIPTION OF THE PREFERRED EMBODIMENTS

Figure 1:
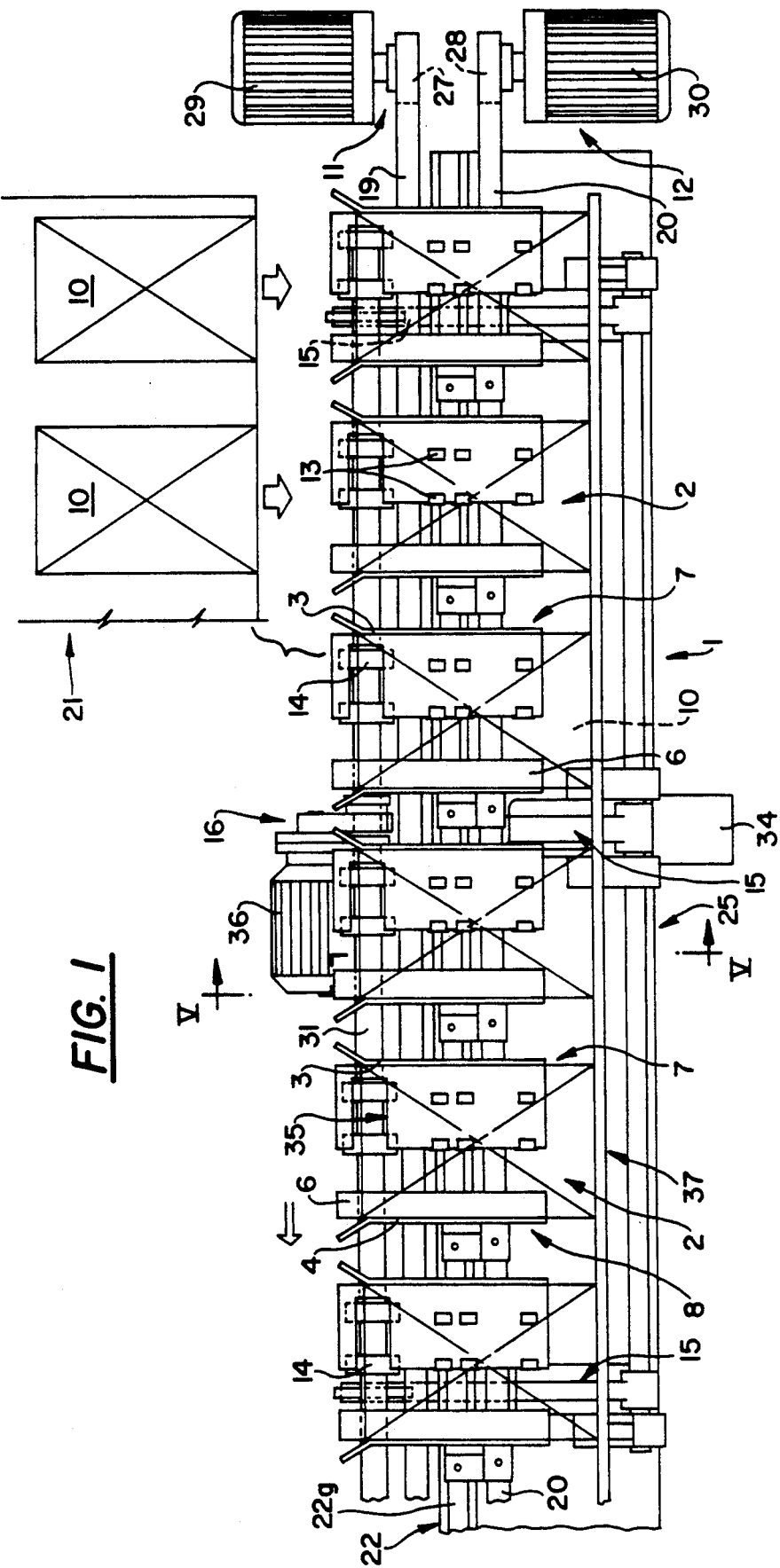
FIG. 1 is a schematic plan view of the device according to the present invention.

The conveyor device according to the present invention is shown in its entirety in FIG. 1 and indicated generally at 1. Conveyor device 1 is positioned at the runout end of an infeed conveyor 21 and comprises at least one compartment 2 capable of movement in a direction perpendicular to that in which the products 10 run out ultimately from the infeed conveyor 21.

The device 1 may be equipped with a plurality of compartments 2 as in the embodiment of FIG. 1, to which reference is made throughout the following specification strictly by way of example and with no limitation implied in regards to the scope of the invention. Each such compartment 2 is encompassed by two vertical walls 3 and 4 parallel with one another, and by two horizontal ledges 5 and 6 that occupy a common plane and are associated respectively with the two walls in such a way as to form two mutually opposed wall members or L-shaped elements 7 and 8 (see FIG. 3). The walls 3 and 4 are splayed at the end of the compartment directed toward the infeed conveyor 21 in such a way as to favor the entry of the products 10. The L-shaped elements 7 and 8 are mechanically associated with respective drive means 11 and 12, which set the L-shaped elements in motion independently but also with a measure of interdependence, as will be made clear in due course. As discernible in FIGS. 1 and 2, one set of L-shaped elements 7 is associated mechanically with one drive means 11, and the other set of L-shaped elements 8 with the remaining drive means 12.

Figure 5:
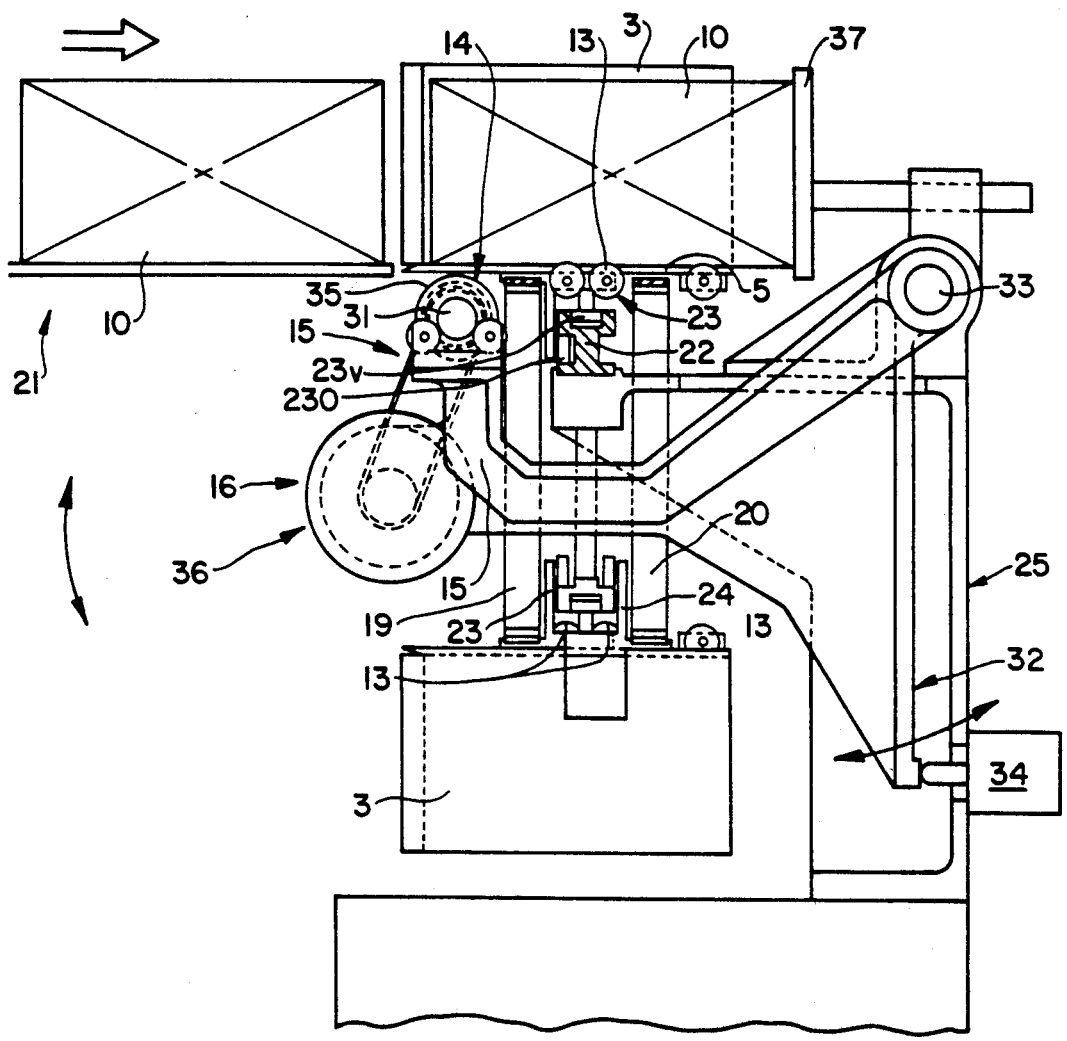
FIG. 5 is the section through V—V in FIG. 1 in which certain parts are omitted better to reveal others.

Each horizontal ledge 5 and 6 is anchored to the top of a respective trolley 23 and 24 (see FIGS. 5 and 4 respectively) supported by a rail 22 mounted in its turn to a frame 25 (see FIG. 5) and appearing as a closed loop with two rectilinear horizontal branches (FIGS. 3 and 5). The rail 22 affords three longitudinal channels of which two, denoted 22m and 22s, are laterally orientated (see FIG. 4). The third, denoted 22g, occupies the outwardly directed frontal face of the closed loop (see also FIG. 4). Each trolley 23 and 24 exhibits two pairs of freely revolving wheels 230, 240 and 23v, 24v rotatable about respective horizontal and vertical axes. Wheels 23v and 24v are arranged to rotate about vertical axes and to run in the frontal channel 22g of the rail 22, while wheels 230 and 240 rotate about horizontal axes running in the respective lateral channels 22m and 22s of the rail 22. In effect, the function of the wheels denoted 230 and 240 is to support the relative trolleys 23 and 24, whilst the wheels denoted 23v and 24v serve to maintain the position of the trolleys 23 and 24, as discernible from FIGS. 4 and 5.

The trolleys 23 and 24 are anchored mechanically to respective looped transmission components 19 and 20 occupying relative vertical planes on either side of the rail 22. Such transmission components are shown in FIG. 3 as a pair of timing belts 19 and 20 looped around respective pulleys 27 and 28 visible in FIG. 1. Pulleys 27 and 28 are driven by relative motors 29 and 30, which, together with the belts 19 and 20, constitute the drive means 11 and 12 mentioned above. More exactly, one trolley 23 is anchored to the relative belt 19 by means of a connecting pin denoted 23c, while the other trolley 24 is anchored to the remaining belt 20 by a connecting pin denoted 24c (FIG. 2). As discernible from FIGS. 1, 2 and 5, the horizontal ledge 5 of each of the L-shaped elements denoted 7 is associated with freely revolving rollers 13 and power driven rollers 14, each rotatable about an axis parallel to the direction established by the rectilinear branches of the rail 22. The freely revolving rollers 13 are supported directly by the corresponding ledges 5, whereas the power driven rollers 14 are carried by a separate structure 15 and set in rotation by respective drive means 16. In the particular embodiment illustrated in FIG. 5, the power driven rollers 14 are keyed to a shaft 31 carried by support means that includes in arms 32 forming part of the aforementioned structure 15 and articulated with the frame 25 by way of a pivot denoted 33. The arms 32 are capable of movement, brought about by actuator means 34 anchored to the frame 25, in such a way as to raise and lower the shaft 31 between two limit positions so that the uppermost portion of the peripheral surface of each power driven roller 14 lies respectively above and below the bearing surface of the corresponding horizontal ledge 5 when the shaft is raised and lowered. Accordingly, each ledge 5 affords a gap 35 through which the power driven rollers 14 can project. The drive means 16 includes a motor 36, carried by the arms 32 as illustrated in FIG. 5 and connected mechanically to the shaft 31.

Figure 6:
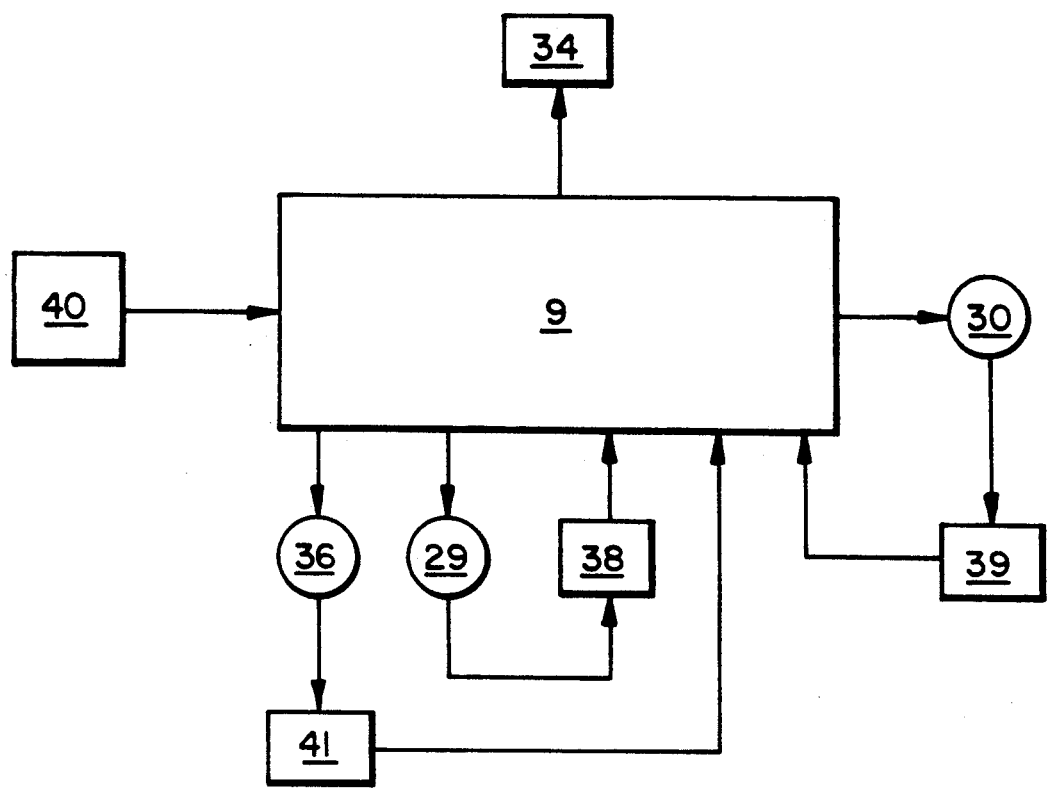
FIG. 6 shows a block diagram illustrative of one possible operative relationship of the device according to the invention.

FIGS. 1, 2, 4 and 5 further illustrate a vertical reference wall 37 disposed parallel to the rail 22, located on the side remote from the conveyor 21, which is supported adjustably by the frame 25 and capable of movement inwardly towards compartments 2 and outwardly away from compartments 2. The device 1 also comprises a number of sensors or encoders 38, 39 and 41 capable of monitoring the angular velocity and position of the motors 29, 30 and 36 (see FIG. 6). The encoders 38, 39 and 41, the motors 29, 30 and 36 and the actuator means 34 are all connected to a central control unit for 9 monitoring and controlling the operation of the entire device 1. The operation of the device 1 is governed entirely by the central control unit 9, into which an input device 40 such as a keyboard will be connected. The operating cycle commences with the belts 19 and 20 at standstill and the actuator 34 deactivated to leave the power driven rollers 14 in the at-rest position below the bearing surfaces of the relative ledges 5 (position 0 in FIG. 7). In this situation, the walls 3 and 4 are set apart from one another at a distance greater than the width value entered for the single product or stack of products 10, so that the product can be introduced more easily into the compartment 2.

The infeed conveyor 21 is activated to direct one or more products 10 toward the device 1. At the same time, the power driven rollers 14 are raised by the actuator 34 such that their rolling surfaces project above the bearing surfaces of the ledges 5, and set in rotation by the motor 36. Thereafter, the products 10 are released progressively from the conveyor 21 onto the ledges 5 and 6, and their passage into the respective compartments 2 is assisted by the action of the rollers 14. At a certain point, the products 10 are taken up onto the freely revolving rollers 13 and propelled further by the action of the power driven rollers 14 alone, until contact is made with the reference wall 37 (see FIG. 5). The actuator 34 is then deactivated, the motor 36 either being deactivated or continuing to operate, whereupon the motor denoted 29 is activated to set the corresponding belt 19 in motion, and with it the relative L-shaped elements 7 (step 1, FIG. 7). This has the effect of drawing the one vertical wall 3 toward the other wall 4 through a distance entered in the central control unit 9 and sensed by the relative encoder 38.

Figure 7:
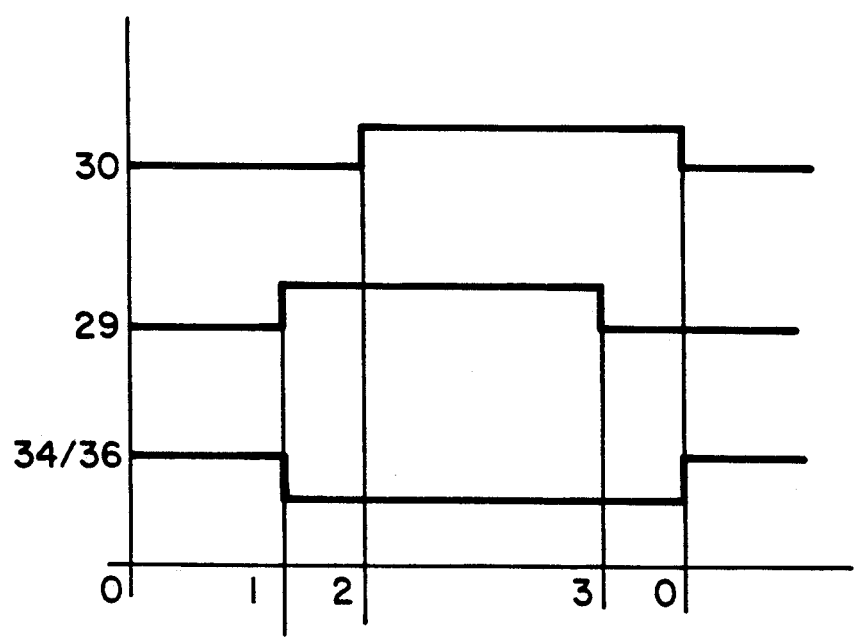
FIG. 7 is a graph showing the operating steps of the device disclosed.

Once the central control unit 9 acknowledges, on the basis of the information received from the encoder 38, that the belt 19 and the walls 3 have moved through a distance equal to the difference between the distance separating the walls 3 and 4 corresponding to the dimension of the product 10), the motor 30 is activated by the central control unit 9, so as to set the remaining belt 20 and the relative walls 4 in motion (step 2, FIG. 7). The position of L-shaped elements 7 and 8, which determines the size of the compartments 2 in one dimension, will now be advanced synchronously by the two respective drive means 11 and 12. The control unit 9 continues, meanwhile, to receive information from the encoders 38 and 39 as to the angular position of the output shafts of the motors 29 and 30, which, in turn, determines the position of the vertical walls 3 and 4. On the basis of this information the control unit 9 will pilot the two motors 29 and 30 to maintain the distance between the vertical walls 3 and 4 substantially constant, and equivalent to the corresponding dimension of the products 10. In effect, therefore, the two motors 29 and 30 operate synchronously in order to conserve the relative positions of the two walls 3 and 4.

For removal of the products from compartments 2, the relative encoder 38 indicates that the walls 3 first set in motion have covered a prescribed distance, and, in response, the central control unit 9 shuts off the corresponding motor 29 while allowing the remaining motor 30 to run (step 3, FIG. 7) until the relative walls 4 have completed their allotted distance. Evidently enough, the effect of such a step is to spread the walls 3 and 4 to the relative positions occupied at the start of the cycle (position 0, FIG. 7), thereby facilitating the removal of the products 10 from the compartments 2 by means not illustrated in the drawings. The extreme flexibility of the device according to the invention is thus clearly illustrated. Adaptation of the device to a new size of product 10 can be accomplished simply by entering the appropriate values in the central control unit 9 by way of the keyboard 40.

It should also be noted that in the instance that the width of the product happens to be greater than the distance between centers of adjacent compartments 2, then a given number of the L-shaped elements 7 and 8 will be removed and the remaining elements 7 and 8 spaced appropriately apart along the belts 19 and 20 and anchored in new positions.

The foregoing preferred specific embodiment has been shown and described for the purpose of this invention and is subject to change without departure from such principles. Therefore, this invention includes all modifications encompassed within the spirit and scope of the following claims.

What is claimed:

1. A device for receiving and transferring products comprising:
   at least one compartment moveable in a direction substantially perpendicular to that in which the products are received by the device, said at least one compartment having opposing vertical wall members spaced apart to define a size thereof, at least one of said vertical wall members being moveable to adjust the size of said at least one compartment;
   drive means for initially moving said at least one vertical wall member to adjust the size of said at least one compartment according to a predetermined value corresponding to a size of the product to be transferred and subsequently moving the vertical wall members at a substantially equal velocity to move the compartment in the direction substantially perpendicular to that in which the products are received by the device; and
   a conveyor device central control unit having means for receiving therein the predetermined value corresponding to the product size and controlling said drive means to (1) move said at least one wall member to adjust the size of the compartment according to the predetermined value so that the size of the compartment corresponds to the size of the product and (2) subsequently move said wall members at substantially equal velocity to move the compartment in the direction substantially perpendicular to that in which the products are received by the device.

2. The device as claimed in claim 1 wherein said opposing vertical wall members are substantially parallel to one another and include horizontal ledges rigidly fixed thereto, said horizontal ledges lying in a common plane with one another and extending inwardly towards one another so that said opposing vertical wall members are configured as mutually opposing L-shaped elements.

3. The device as claimed in claim 2 wherein the drive means comprises at least one motor and a plurality of drive belts, said vertical wall members being fixed to said drive belts so that said vertical wall members are moved when said drive belts are driven, said at least one motor cooperable with said drive belts to drive said drive belts and thereby move said vertical wall members.

4. The device as claimed in claim 3 wherein the drive belts are of a closed loop configuration.

5. The device as claimed in claim 4 wherein the vertical wall members are supported by a rail of closed loop configuration.

6. The device as claimed in claim 2 further comprising freely revolving rollers and power driven rollers associated with at least one of the horizontal ledges of each compartment and rotatable about relative axes disposed parallel with the direction of movement of the compartments, said horizontal ledges having a bearing surface, and said rollers having a peripheral rolling surface having an outermost surface projecting through said bearing surface at least during a period in which the drive means is deactivated.

7. The device as claimed in claim 6 wherein the freely revolving rollers are mounted to at least one of the horizontal ledges of each compartment and the power driven rollers are carried by an independent supporting structure capable of movement between an operative and inoperative position, said power driven rollers having the outermost position of said peripheral rolling surface below said bearing surface during said inoperative position and above said bearing surface during said operative position, said power driven rollers being rotated by a drive shaft activated by said central control unit.

8. The device as claimed in claim 7 wherein said drive shaft is activated by said control unit when said drive means of said wall members is deactivated.

9. A conveyor system for controlling the accommodation and speed of products to be carried thereon, said conveyor system comprising:

a train of compartments, each of said compartments being defined by opposing first and second vertical wall members spaced apart to define a compartment size, at least one of said first and second vertical wall members being movable to adjust the compartment size;

a drive mechanism comprising first and second motors capable of moving said first and second vertical wall members respectively;

a central control unit having a means for (1) receiving a product size value corresponding to a product size, and (2) controlling the operation of said first and second motors so that (a) said first motor moves said first vertical wall member to adapt the compartment size according to the product size value so that the compartment size corresponds to the product size, and (b) said first and second motors move said compartment by moving said first and second vertical wall members in a same direction at substantially equal velocities after the compartment size has been adapted.

10. The device as claimed in claim 9 wherein said first and second wall portions are substantially parallel with one another and each include a horizontal ledge rigidly fixed thereto, the horizontal ledge of said first wall and the horizontal ledge of said second wall lying in a common plane and extending inwardly towards one another so that said first and second wall portions are configured as mutually opposing L-shaped elements.

* * * * *